United States Patent
Satou et al.

(10) Patent No.: US 7,370,471 B2
(45) Date of Patent: May 13, 2008

(54) INTERNAL COMBUSTION ENGINE CONTROLLER

(75) Inventors: Shinya Satou, Hitachinaka (JP); Shinji Nakagawa, Hitachinaka (JP); Mamoru Nemoto, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 10/568,088

(22) PCT Filed: Aug. 13, 2003

(86) PCT No.: PCT/JP03/10293

§ 371 (c)(1), (2), (4) Date: Feb. 13, 2006

(87) PCT Pub. No.: WO2005/017336

PCT Pub. Date: Feb. 24, 2005

(65) Prior Publication Data

US 2006/0218898 A1    Oct. 5, 2006

(51) Int. Cl.
*F01N 3/00* (2006.01)
(52) U.S. Cl. ............... 60/285; 60/274; 60/277
(58) Field of Classification Search .......... 60/274, 60/277, 285, 299
See application file for complete search history.

(56) References Cited

U.S. PATENT DOCUMENTS 5,067,579 A * 11/1991 Kushi et al. ............... 180/197
6,155,230 A    12/2000 Iwano et al.

FOREIGN PATENT DOCUMENTS

| DE | 1973956 | 7/1967 |
| JP | 2-230935 | 9/1990 |
| JP | 10-220267 | 8/1998 |
| JP | 11-072033 | * 3/1999 |
| JP | 11-141388 | 5/1999 |

* cited by examiner

*Primary Examiner*—Thomas Denion
*Assistant Examiner*—Diem Tran
(74) *Attorney, Agent, or Firm*—Mattingly, Stanger, Malur & Brundidge, PC

(57) ABSTRACT

An internal combustion engine controller for automobiles which realizes torque increasing performance and exhaust gas purifying performance in a well-balanced manner even when a high-response torque increase is demanded in uniform charge stoichiometric combustion which is operated at a value close to the theoretical air-fuel ratio in torque base type engine control.

The internal combustion engine controller comprises target torque computation means for computing the target torque based on the demand torque of the internal combustion engine such as the operation quantity of an accelerator, means of computing the target throttle angle based on the target torque, and torque assist control means for assisting torque based on the state of the target torque and the operation state of the internal combustion engine. The above torque assist control means carries out torque assist control by increasing the quantity of fuel when a torque increase is demanded.

6 Claims, 9 Drawing Sheets

INTERNAL COMBUSTION ENGINE CONTROLLER

TECHNICAL FIELD

The present invention relates to an internal combustion engine controller and, specifically, to an internal combustion engine controller for automobiles, which carries out torque base type control based on accelerator or external demand torque.

BACKGROUND ART

As for the engine torque control of an internal combustion engine controller for automobiles, so-called "torque base (torque demand) type engine control" in which target engine torque is computed from the angle of an accelerator and the speed of an engine and throttle control, fuel control and ignition control are carried out to achieve the target engine torque and the target air-fuel ratio has recently been implemented.

The torque base (torque demand) type engine control of the internal combustion engine has advantages that a torque difference at the time of switching between uniform charge combustion and stratified charge combustion in a stratified charge lean combustion system can be reduced and that traction control and engine torque demanded from an external device such as an auto-cruise or AT can be processed smoothly by adding an interface for external demand torque to a logic for computing the above target engine torque.

The above torque base type engine control has an advantage that torque control can be carried out while the target air-fuel ratio is maintained as torque control is basically carried out by controlling the quantity of air sucked by an electrically controlled throttle. However, it has a problem that its response for achieving desired torque is low due to a phenomenon that the supply of intake air into cylinders is delayed. To cope with this problem, when high-speed response is desired for traction control or VDC (vehicle dynamics control), for example, other torque control means is used in combination to improve the torque response. As one example of this, there is known technology making use of a fuel cut or ignition retard when torque is reduced (deceleration).

Another technology concerning the torque response is disclosed by JP-A H11-72033, for example. In this technology, when high-speed torque response is desired in a stratified charge lean combustion system, the torque response is improved by correcting the ignition time at the time of uniform charge combustion and the air-fuel ratio at the time of stratified charge combustion. In this technology, torque correction is carried out by correcting the ignition time as the purification efficiency of a three-way catalyst is reduced to deteriorate exhaust gas when the air-fuel ratio is corrected at the time of uniform charge combustion, and torque correction is carried out by correcting the air-fuel ratio in the case of stratified charge combustion as the variable range of ignition time is small.

Meanwhile, as for the recent exhaust gas purification control of an automobile internal combustion engine, there is generally known technology for improving the exhaust purification ratio with a three-way catalyst by carrying out air-fuel ratio feed-back control, using a detection signal from an $O_2$ sensor installed in the exhaust pipe, so that the air-fuel ratio becomes a value close to the theoretical air-fuel ratio.

However, the three-way catalyst has an $O_2$ storage effect (effect of storing oxygen in a catalyst) and the function of reacting with an exhaust component in the catalyst so that the stored $O_2$ cancels a shift from the theoretical air-fuel ratio in exhaust from the engine. Therefore, when air-fuel ratio feed-back control is carried out by using information only from the $O_2$ sensor without considering the exhaust purification function of the stored $O_2$, the correction quantity of fuel becomes inappropriate and over-correction occurs, thereby deteriorating the exhaust gas. To cope with this problem, for example, technology disclosed by JP-A H2-230935 is to prevent the deterioration of the purification of exhaust gas by adjusting the amount of air-fuel ratio feed-back control based on an estimated value obtained by $O_2$ storage quantity estimation means for estimating the storage quantity of $O_2$ in a three-way catalyst provided in an internal combustion engine controller.

For the torque base type control of the conventional internal combustion engine controller for automobiles, technology for improving the torque response by using other high-speed torque control means is used to compensate for a delay in the supply of intake air when high-speed torque response is desired. In a uniform charge stoichiometric combustion system which is operated at a value close to the theoretical air-fuel ratio, there has not been proposed appropriate torque assist means when high-speed torque increase is demanded during non-idling.

One of the reasons for this is that torque increase is impossible at the time of non-idling by further advancing the ignition time as a value (MBT) at which the ignition time is advanced to enable the generation of the maximum torque is generally set as a standard ignition time even when torque assist is tried by changing the ignition time.

Another reason is that when the air-fuel ratio is simply made rich, the purification of exhaust gas may be deteriorated (specifically, increases in the quantities of CO or HC) as the air-fuel ratio must be maintained at a value close to the theoretical air-fuel ratio due to the exhaust gas purification properties of the three-way catalyst used in a uniform charge stoichiometric combustion system though it is commonly known that the torque can be increased by making the air-fuel ratio rich (for example, power air-fuel ratio of about 12) as for the technology of assisting torque by the air-fuel ratio control of an internal combustion engine.

It is an object of the present invention which has been made in view of the above problems to provide an internal combustion engine controller for automobiles which can realize torque increasing performance and exhaust gas purification performance in a well-balanced manner even when a high-speed torque increase is demanded in uniform charge stoichiometric combustion which is operated at a value close to a theoretical air-fuel ratio in the torque base type engine control of an internal combustion engine.

DISCLOSURE OF THE INVENTION

To attain the above object, the internal combustion engine controller of the present invention comprises target torque computation means for computing target torque based on the demand torque of an internal combustion engine such as the operation of an accelerator and demand torque from an external system, means of computing a target throttle angle based on the target torque, and torque assist control means for controlling torque assist based on the state of the target torque and the operation states of the internal combustion engine and the external system, the torque assist control means comprises fuel correction quantity computation means, ignition time correction quantity computation means and fuel cut cylinder number computation means, the fuel correction quantity computation means comprises fuel correction permission judging means, and the fuel correction permission judging means judges whether fuel correction should be permitted or not based on the state of the target torque, the operation state of the external system and the estimated adsorption quantity of oxygen in the catalyst and carries out torque assist control by increasing the quantity of fuel when a torque increase is demanded.

The above fuel correction quantity computation means comprises fuel correction permission judging means, and the fuel correction permission judging means judges whether fuel correction should be permitted or not based on the state of the target torque, the operation state of the external system and the estimated adsorption quantity of oxygen in the catalyst.

The above external demand torque is demand torque from an auto-cruise, transmission or vehicle dynamic control, and the operation state of the internal combustion engine is the uniform charge stoichiometric combustion state of the internal combustion engine having a three-way catalyst.

The thus constituted internal combustion engine controller of the present invention carries out torque assist control by increasing the quantity of fuel according to circumstances in consideration of the emergency of a torque increase demand, the operation state such as the uniform charge stoichiometric combustion state of the internal combustion engine and the storage quantity of $O_2$ in the three-way catalyst, thereby making it possible to realize torque increasing performance and exhaust gas purifying performance in a well-balanced manner.

As a specific embodiment of the internal combustion engine controller of the present invention, the above fuel correction permission judging means permits torque assist control by increasing the quantity of fuel when torque increase is demanded by an external system such as vehicle stable control, brake control and traction control.

Further, the above fuel correction permission judging means permits torque assist control by increasing the quantity of fuel when the estimated adsorption quantity of oxygen in the catalyst is larger than a predetermined threshold value.

Still further, the above fuel correction permission judging means comprises means of judging the emergency of a torque increase demand and permits torque assist control by increasing the quantity of fuel regardless of the storage quantity of oxygen in the catalyst for a torque increase demand having high emergency.

The above fuel correction quantity computation means comprises oxygen storage computation means which increases the target adsorption ratio of oxygen in the catalyst when torque assist control by increasing the quantity of fuel is permitted.

Further, the oxygen storage computation means returns the target adsorption ratio of oxygen in the catalyst to a normal value with a time delay when decision on the permission of torque assist control by increasing the quantity of fuel comes to an end.

In the specific embodiment of the thus constituted internal combustion engine controller of the present invention, the contents of control can be changed as follows according to the emergency of a torque increase demand.

When emergency is relatively low like a torque increase demand at the time of operating the accelerator, it is judged whether torque assist by increasing the quantity of fuel should be permitted in consideration of the storage quantity of $O_2$ in the three-way catalyst. When it is judged that torque assist is permitted, torque assist control is carried out by increasing the quantity of fuel. More specifically, when the storage quantity of $O_2$ in the three-way catalyst estimated by the $O_2$ storage quantity estimation means is large enough, the quantity of fuel is increased and when the storage quantity of $O_2$ is small, an increase in the quantity of fuel is inhibited. Thereby, the deterioration of the exhaust gas (increases in the quantities of CO and HC) by increasing the quantity of fuel can be prevented.

Meanwhile, in the case of a torque increase demand having higher emergency, for example, a torque increase demand from an external system related to safety such as VDC, traction control or brake control, regardless of the storage quantity of $O_2$, torque assist control is carried out by increasing the quantity of fuel. In this case, for a certain period of time from the start of control, air-fuel ratio control is carried out to increase the target storage quantity of $O_2$ to a value larger than the regular quantity so as to increase the exhaust purifying performance of the three-way catalyst at the time of increasing the quantity of fuel, thereby preventing the deterioration of the exhaust gas as much as possible.

BRIEF DECRIPTION OF DRAWINGS

Figure 2:
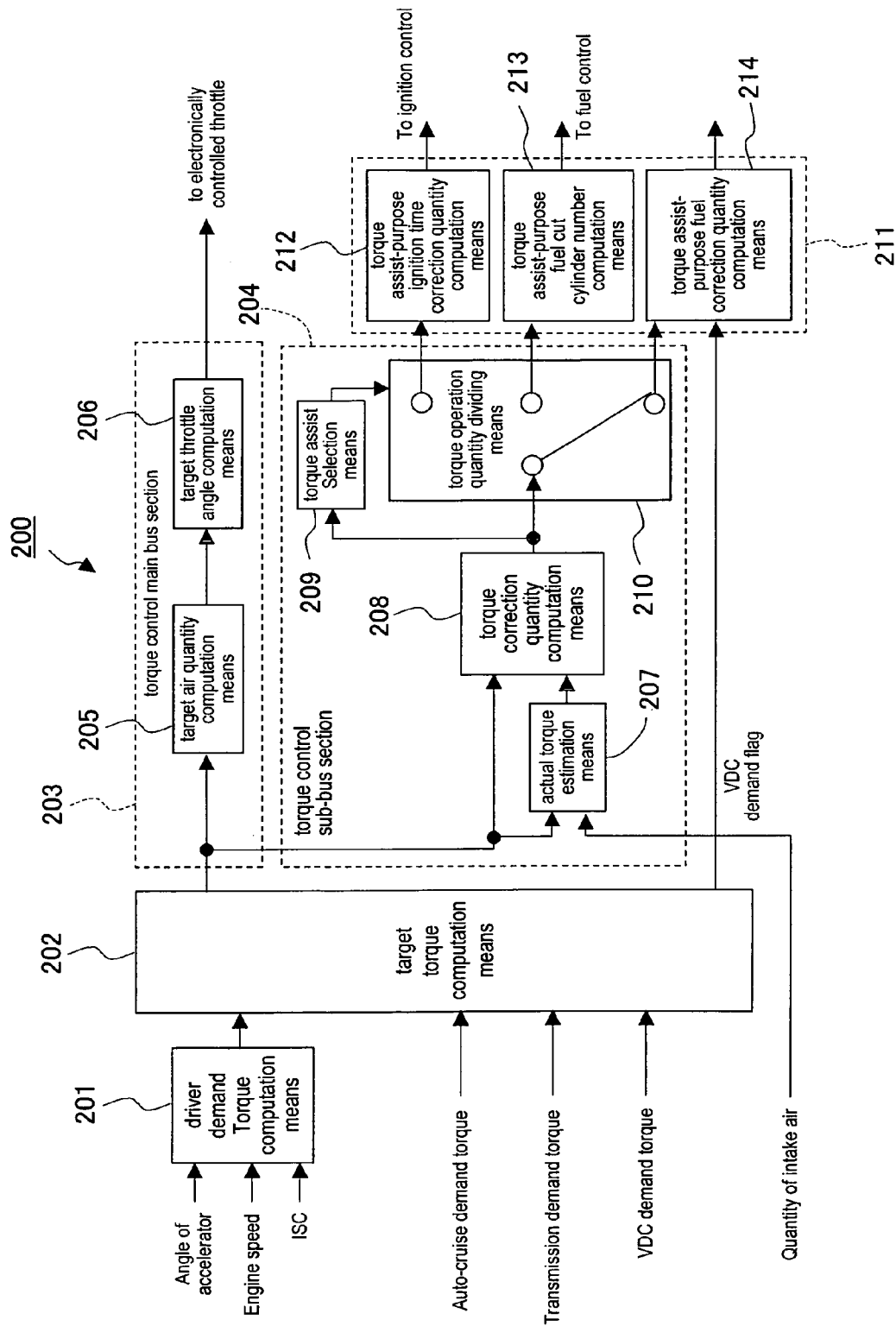
FIG. 2 is a control block diagram of the torque base type engine control unit of an internal combustion engine controller according to a first embodiment of the present invention.
Figure 10:
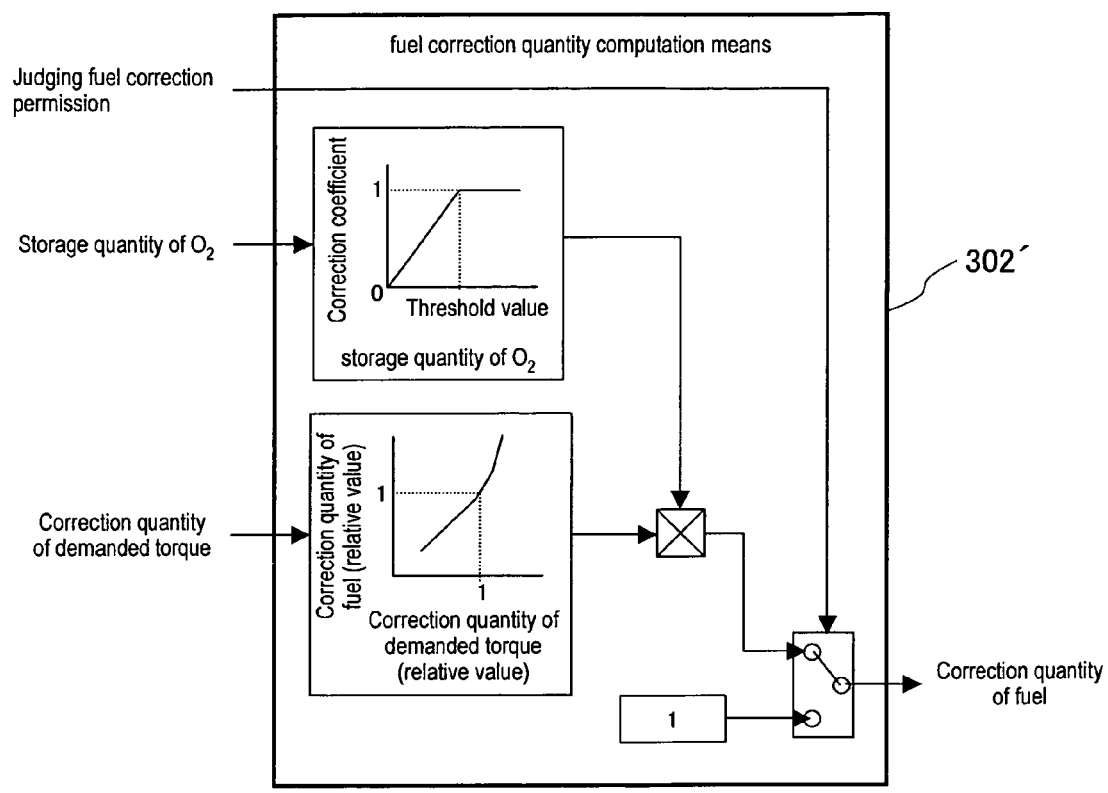
Figure 11:
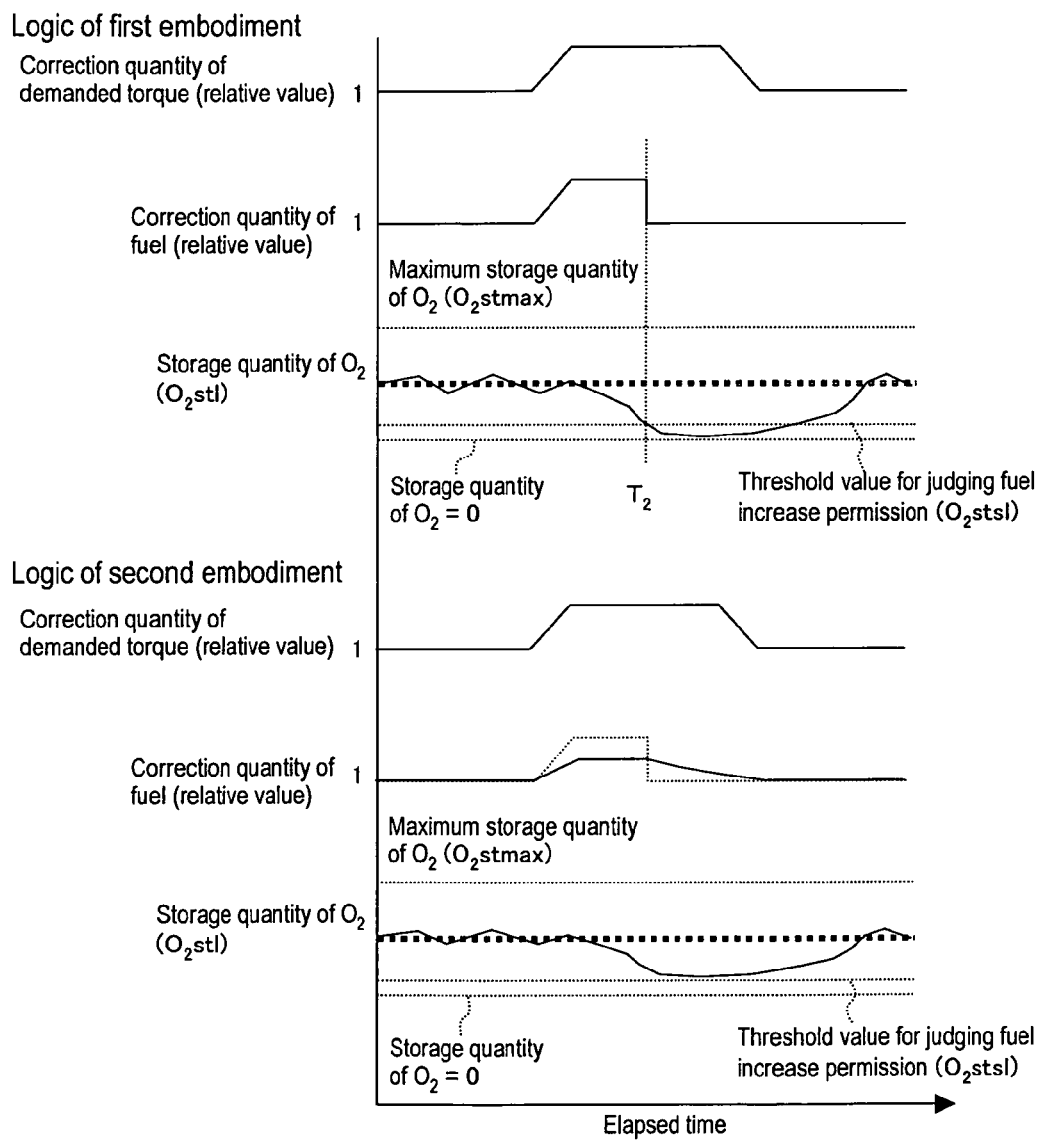

FIG. 10 is a diagram showing the contents of the fuel correction quantity computation means in the torque assist-purpose fuel correction quantity computation means in the torque base type engine control unit of the internal combustion engine controller according to a second embodiment of the present invention; and FIG. 11 is a diagram showing the behavior of each operation value when a torque increase is demanded from the internal combustion engine controller of the first embodiment shown in FIG. 2 and the internal combustion engine controller of the second embodiment shown in FIG. 10.

BEST MODE FOR CARRYING OUT THE INVENTION

Preferred embodiments of the internal combustion engine controller of the present invention will be described in detail hereinunder with reference to the accompanying drawings.

Figure 1:
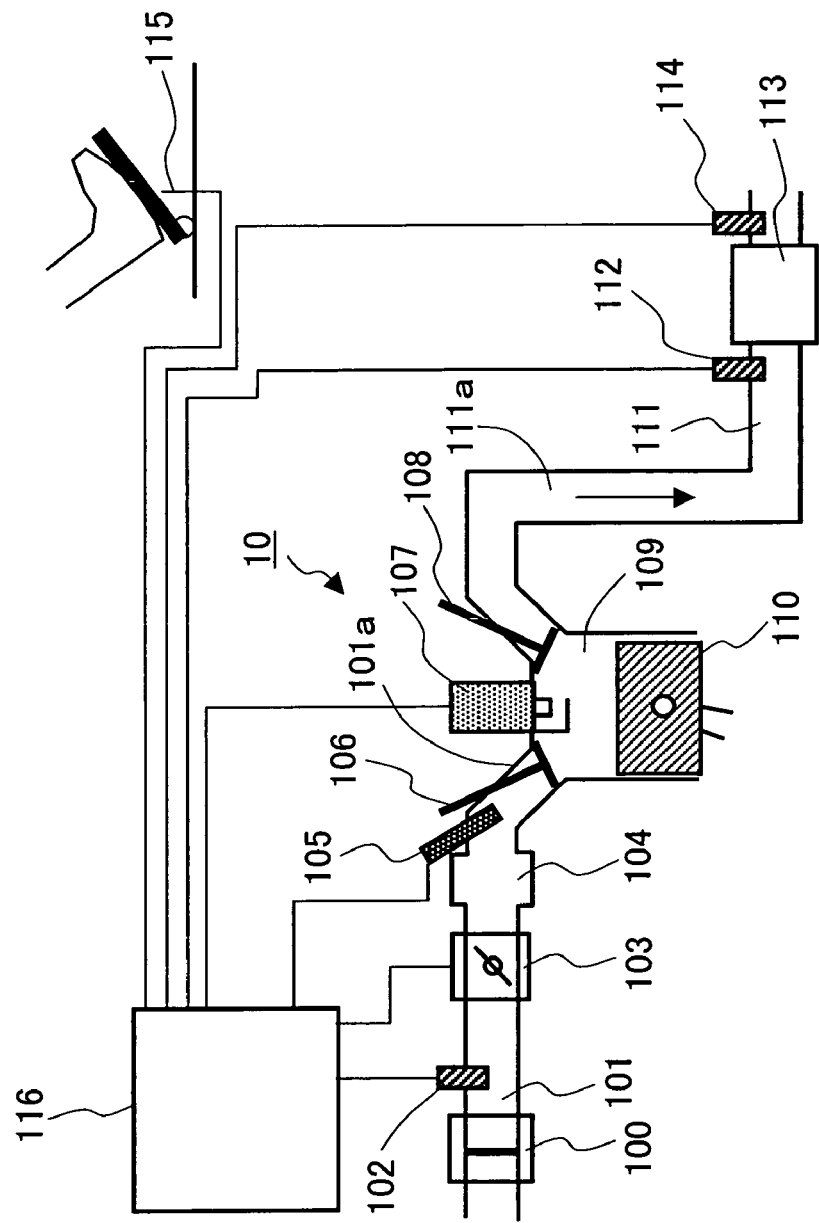
FIG. 1 is a diagram showing the whole constitution of a control system common to embodiments of the internal combustion engine controller of the present invention.

FIG. 1 shows the whole constitution of the control system of an internal combustion engine controller according to a first embodiment of the present invention. The internal combustion engine 10 is a multi-cylinder internal combustion engine, and a piston 110 is slidably fitted in each cylinder 109, an ignition plug 107 is attached to the cylinder 109, and an intake pipe 101 and an exhaust pipe 111 are connected to the cylinder 109. An intake valve 105 and an exhaust valve 108 are installed in connection portions between the intake pipe 102 (intake manifold 101a) and the cylinder 109 and between the exhaust pipe 111 (exhaust manifold 111a) and the cylinder 109, respectively.

After intake air from the inlet of the intake pipe 101 passes through an air cleaner 100 and the quantity of intake air is measured by an air flow sensor 102 mounted in the intake pipe 101, intake air is introduced into the inlet of an electronically controlled throttle valve 103 for adjusting the quantity of intake air (to be referred to as "electronically controlled throttle 103" hereinafter). The intake air passing through the electronically controlled throttle 103 passes through a collector 104, is introduced into the intake manifold 101a and mixed with a spray of fuel (such as gasoline) from an injector 105 according to a fuel spray pulse width signal to become an air-fuel mixture which is then introduced into the cylinder 109 in synchronism with the opening and closing of the intake valve 106.

After the intake valve 106 is closed, the air-fuel mixture introduced into the cylinder 109 is compressed by the rise of the piston 110 and ignited by the ignition plug 107 at a point right before a compression top dead point to be burnt, quickly expands to push down the piston 110 and generates engine torque.

Thereafter, the piston 110 rises and an exhaust step begins from the moment when the exhaust valve 108 opens, and the burnt exhaust gas is discharged into the exhaust manifold 111a. A three-way catalyst 113 for purifying the exhaust gas is installed in the exhaust pipe 11 at the downstream of the exhaust manifold 111a to convert the HC, CO and NOx exhaust components of the exhaust gas into $H_2O$, $CO_2$ and $N_2$ when the exhaust gas passes through it. A wide-area air-fuel ratio sensor 112 and an $O_2$ sensor 114 are installed at the inlet and the outlet of the three-way catalyst 113, respectively.

A control unit (control unit ECU) 116 is arranged in the internal combustion engine 10 to carry out operations by receiving signals from the detection sensors and output the results of the operations to control units. An operation signal from an accelerator pedal 115 and air-fuel ratio information signals metered by the above wide-area air-fuel ratio sensor 112 and the $O_2$ sensor 114 are supplied to the control unit (ECU) 116, and the measurement value of the air flow sensor 102 is also supplied to the control unit (ECU) 116.

The control unit (ECU) 116 outputs a drive signal to the electronically controlled throttle 103 based on the operation signal of the accelerator pedal 115 and carries out air-fuel ratio feed back control by adjusting the injection quantity of fuel so that the air-fuel ratio becomes the theoretical air-fuel ratio based on the information signals from the wide-area air-fuel ratio sensor 112 and the $O_2$ sensor 114. That is, the fuel injection pulse width is computed and output to the injector 105 so that the air-fuel ratio becomes the theoretical air-fuel ratio.

FIG. 2 is a control block diagram of torque base type engine control for uniform charge stoichiometric combustion which is operated at a value close to the theoretical air-fuel ratio in the system of this embodiment of FIG. 1.

FIG. 2 a control block diagram of the torque base type engine control unit 200 of the internal combustion engine controller of this embodiment.

The torque base type engine control unit 200 comprises driver demand torque computation means 201, target torque computation means 202, torque control main bus section 203, torque control sub-bus section 204 and torque assist control means 211.

The driver demand torque computation means 201 for computing basic demand torque in torque base type engine control computes engine torque demanded by a driver based on accelerator angle, engine speed and demand torque from idle speed control (ISC).

The target torque computation means 202 for computing the final target engine torque receives external demand torques such as transmission demand torque, VDC demand torque and cruise control demand torque in addition to the above driver demand torque to determine the final target engine torque in consideration of the priority order of these.

The torque control main bus section 203 carries out the control of the computed target engine torque by the operation of the quantity of intake air using the electronically controlled throttle 103, and the torque control sub-bus section 204 assists torque control by the operation of fuel and ignition.

The torque control main bus section 203 comprises target air quantity computation means 205 and target throttle angle computation means 206. The target air quantity computation means 205 computes the target quantity of air required for realizing the above target torque and the target throttle angle computation means 206 computes the target throttle angle required for realizing the above target quantity of air and supplies the result of its operation to the electronically controlled throttle 103.

The torque control sub-bus section 204 comprises actual torque estimation means 207, torque correction quantity computation means 208, torque assist selection means 209 and torque operation quantity dividing means 210.

The actual torque estimation means 207 estimates the actual torque based on information from the air flow sensor 102, and the torque correction quantity computation means 205 receives the above estimated actual torque and the above target torque to calculate their ratio so as to compute the correction quantity of torque as an index for torque assist. The torque assist selection means 209 selects the optimum torque assist based on the above correction quantity of torque and the operation state (the air-fuel ratio of the internal combustion engine, that is, the uniform charge stoichiometric combustion operated at a value close to the theoretical air-fuel ratio).

As for torque assist, ignition time correction, fuel cut and fuel correction are available and used alone or in combination. The torque operation quantity dividing means 210 divides the operation quantity of torque among the torque assist-purpose ignition time correction quantity computation means 212, torque assist-purpose fuel cut cylinder number computation means 213 and torque assist-purpose fuel correction quantity computation means 214 of the torque assist control means 211 based on the above correction quantity of torque and the torque assist selected by the above torque assist selection means 209. The torque assist-purpose ignition time correction quantity computation means 212, the torque assist-purpose fuel cut cylinder number computation means 213 and the torque assist-purpose fuel correction quantity computation means 214 of the torque assist control means 211 compute the correction quantity of ignition time, the number of fuel cut cylinders and the correction quantity of fuel based on their portions of the correction quantity of torque and reflect their computation results on the ignition control system and the fuel control system, thereby making it possible to obtain desired engine torque even at the time of transition.

Figure 3:
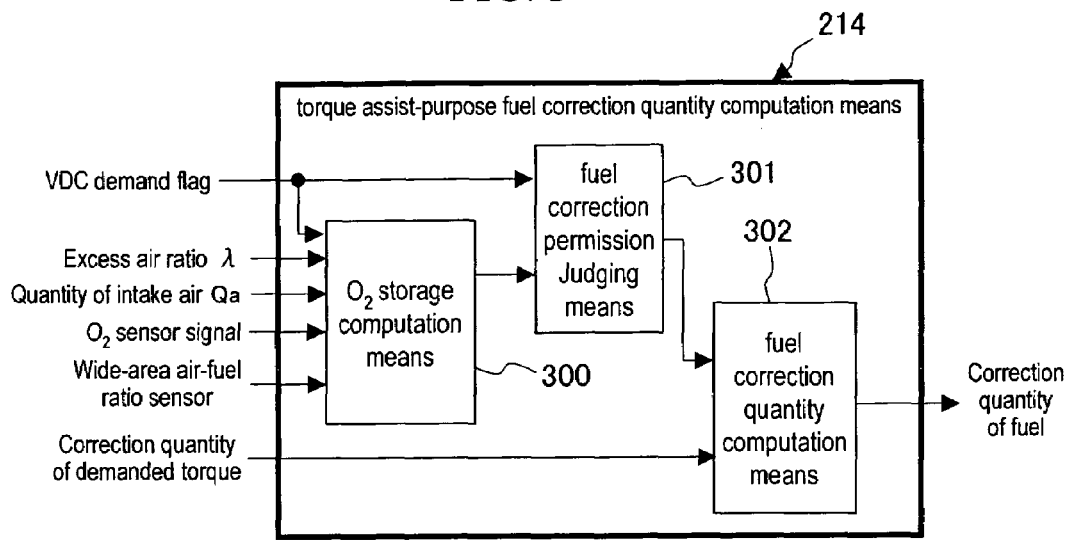
FIG. 3 is a diagram showing the contents of torque assist-purpose fuel correction quantity computation means of the torque base type engine control unit shown in FIG. 2.

FIG. 3 shows details of the above torque assist-purpose fuel correction quantity computation means 213. The torque assist-purpose fuel correction quantity computation means 213 comprises $O_2$ storage computation means 300, fuel correction permission judging means 301 and fuel correction quantity computation means 303. The $O_2$ storage computation means 300 computes (estimates) the storage quantity of $O_2$ based on information from the wide-area air-fuel ratio sensor 112 installed at the inlet of the catalyst 113 and the $O_2$ sensor 114 installed at the outlet of the catalyst 113 and the quantity of intake air obtained from the air flow sensor 102.

The fuel correction permission judging means 301 judges whether fuel correction should be permitted or not based on the target torque information such as VDC demand flag and the storage quantity of $O_2$ computed by the above $O_2$ storage computation means 300. The fuel correction quantity computation means 302 computes the desired correction quantity of fuel based on the above correction quantity of torque when the fuel correction permission judging means 301 outputs permission decision.

Figure 4:
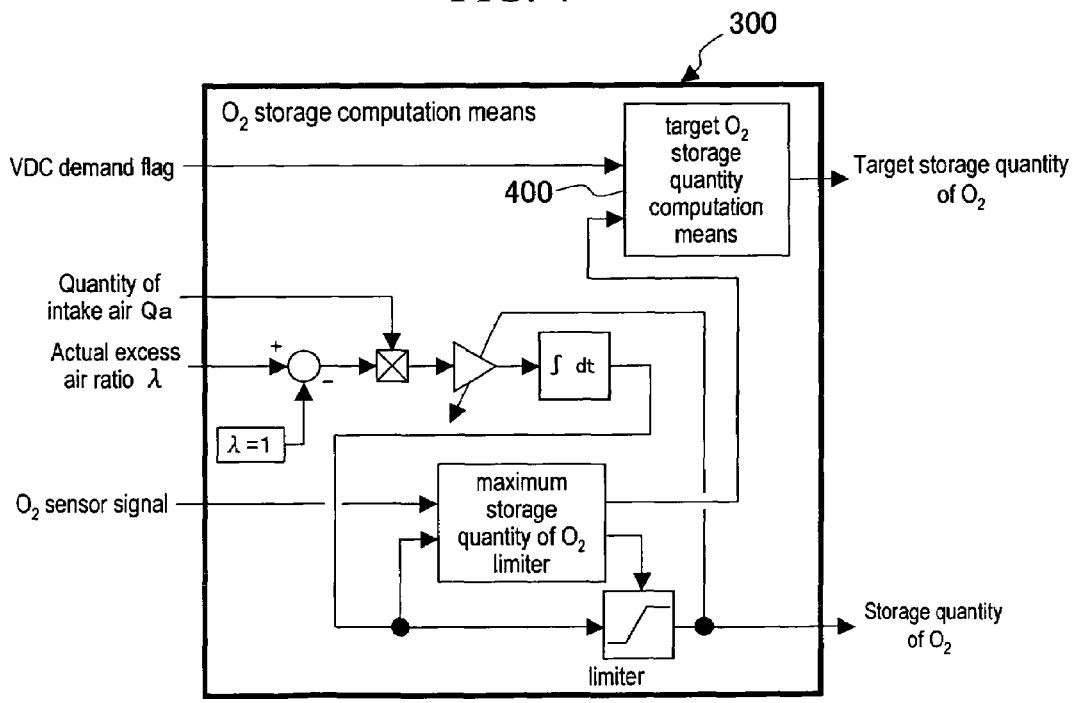
FIG. 4 is a diagram showing the contents of $O_2$ storage computation means in the torque assist-purpose fuel correction quantity computation means shown in FIG. 3.

FIG. 4 shows details of the $O_2$ storage computation means 300. The $O_2$ storage computation means 300 computes the difference $\Delta\lambda$ between the actual air-fuel ratio information (actual excess air ratio $\lambda$) obtained from the wide-area air-fuel ratio sensor 112 installed at the inlet of the catalyst 113 and the theoretical air-fuel ratio (excess air ratio $\lambda=1$). When the air-fuel ratio at the inlet of the catalyst 113 is lean, the difference becomes positive and when the air-fuel ratio is rich, the difference becomes negative.

The estimated storage quantity $O_2$st of $O_2$ is computed by multiplying the obtained difference $\Delta\lambda$ by the intake air quantity information Qa obtained from the air flow sensor 102 and a correction coefficient and by integration. Therefore, when the air-fuel ratio at the inlet of the catalyst 113 is lean, the estimated storage quantity $O_2$st of $O_2$ increases and when the air-fuel ratio at the inlet of the catalyst 113 is rich, the estimated storage quantity $O_2$st of $O_2$ in the three-way catalyst 113 decreases. The storage quantity of $O_2$ in the three-way catalyst 113 is a finite value and has upper and lower limits which satisfy $0<O_2\text{st}<O_2\text{stmax}$ after the above integration.

The maximum storage quantity $O_2$stmax of $O_2$ is inherent to the three-way catalyst 113 in use and changes according to the kind, individual difference and aging of the three-way catalyst 113. To increase the accuracy of $O_2$stmax, after an initial value is given, $O_2$stmax is renewed based on information from the $O_2$ sensor 114 installed at the outlet of the catalyst 113.

A description is subsequently given of the renewal logic. When the storage quantity of $O_2$ does not reach its limit value, even if the air-fuel ratio at the inlet of the catalyst 113 is lean, excess oxygen which causes a shift from the theoretical air-fuel ratio due is absorbed by the three-way catalyst 113 due to its $O_2$ storage function so that the theoretical air-fuel ratio is maintained at the outlet of the catalyst 113, and the $O_2$ sensor 114 outputs a rich value and a lean value repeatedly. However, when the storage quantity of $O_2$ reaches the upper limit value, a purification function by the storage of $O_2$ is lost and the $O_2$ sensor at the outlet of the catalyst 113 outputs a lean value continuously.

The following renewal logic is applied based on the above phenomenon. When the $O_2$ sensor outputs a lean signal continuously for a certain period of time, $O_2$stmax is replaced by the $O_2$st value (before the processing of a limiter) in that state, and the integration operation of the above term ($\Delta\lambda \times Q \times$correction coefficient) is stopped. On the other hand, when the $O_2$ sensor outputs a rich value continuously for a certain period of time, $O_2$st=0 is computed and the integration operation is stopped as well. The correction of an $O_2$ storage estimation error is carried out by this logic.

The $O_2$ storage computation means 300 is provided with target $O_2$ storage quantity computation means 400 which computes the optimum target storage quantity of $O_2$ according to each condition (at the time of normal operation and at the time of permitting fuel correction) and supplies it to a fuel injection quantity computation unit (not shown).

Figure 5:
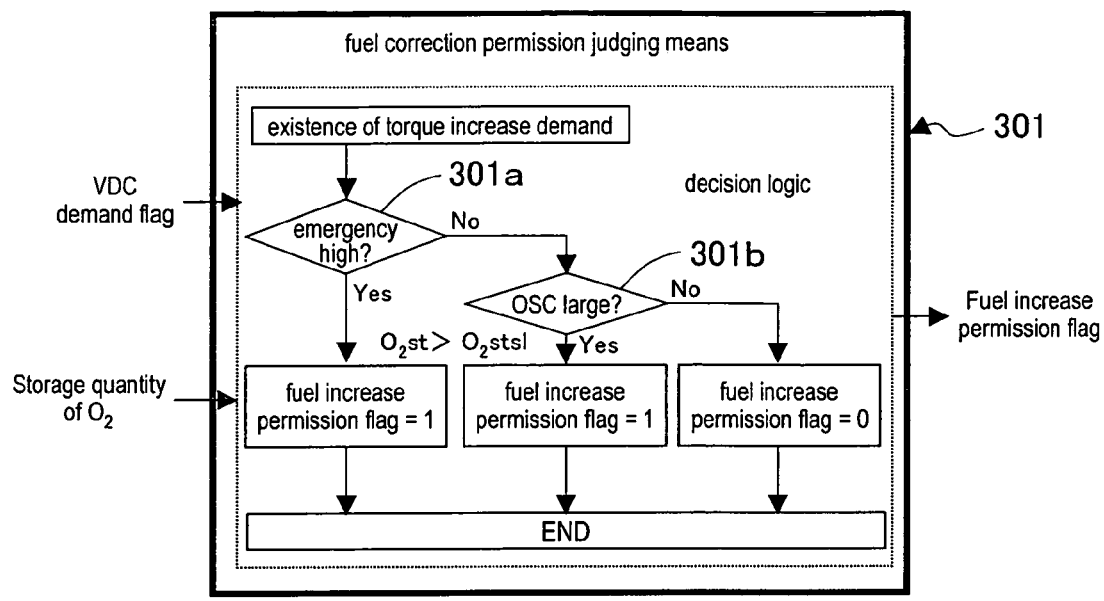
FIG. 5 is a diagram showing the contents of fuel correction permission judging means in torque assist-purpose fuel correction quantity computation means shown in FIG. 3.

FIG. 5 shows details of the fuel correction permission judging means 301. In the first step 301a, the emergency of torque operation is judged based on VDC demand flag or the differential value of target torque (an increase per unit time). When it is judged that the emergency is high, the fuel correction permission decision flag is set to 1. When it is judged that the emergency is not high, the routine proceeds to the next step 301b. In the step 301b, the estimated storage quantity of $O_2$ computed by the above $O_2$ storage computation means 300 is compared with a threshold value $O_2$stsl related to fuel correction permission. Since the quantity of fuel is increased when a torque increase is demanded, the air-fuel ratio at the inlet of the three-way catalyst 113 at the time of executing torque assist becomes rich. For the prevention of the deterioration of the exhaust gas, the storage quantity of $O_2$ in the three-way catalyst 1134 must be large enough. When the estimated storage quantity of $O_2$ is lager than the threshold value $O_2$stsl at the time of demanding a torque increase, the fuel correction permission decision flag is set to 1 and when the estimated storage quantity of $O_2$ is smaller than $O_2$stsl, fuel correction is not permitted.

Figure 6:
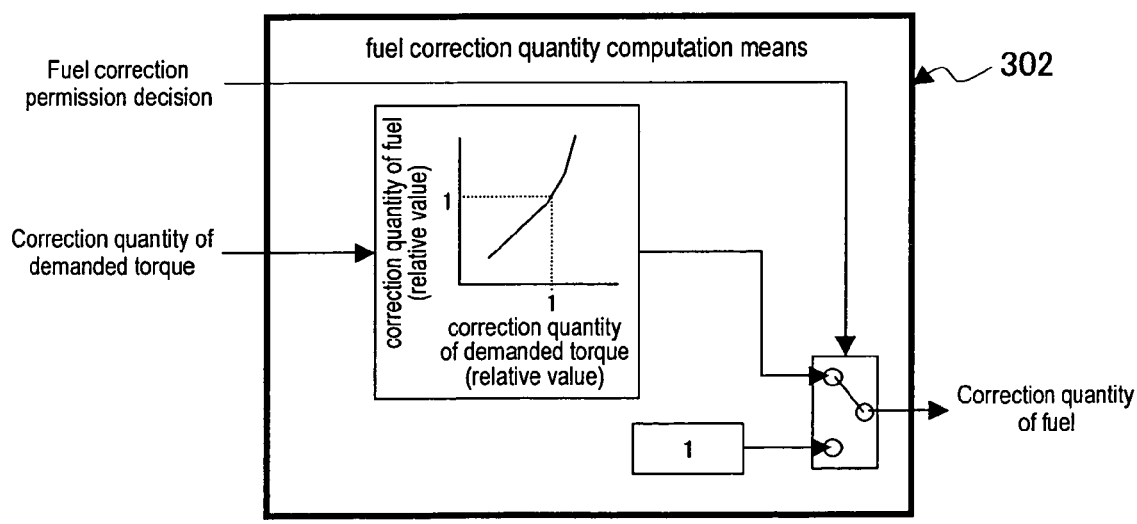
FIG. 6 is a diagram showing the contents of fuel correction quantity computation means in the torque assist-purpose fuel correction quantity computation means shown in FIG. 3.
Figure 7:
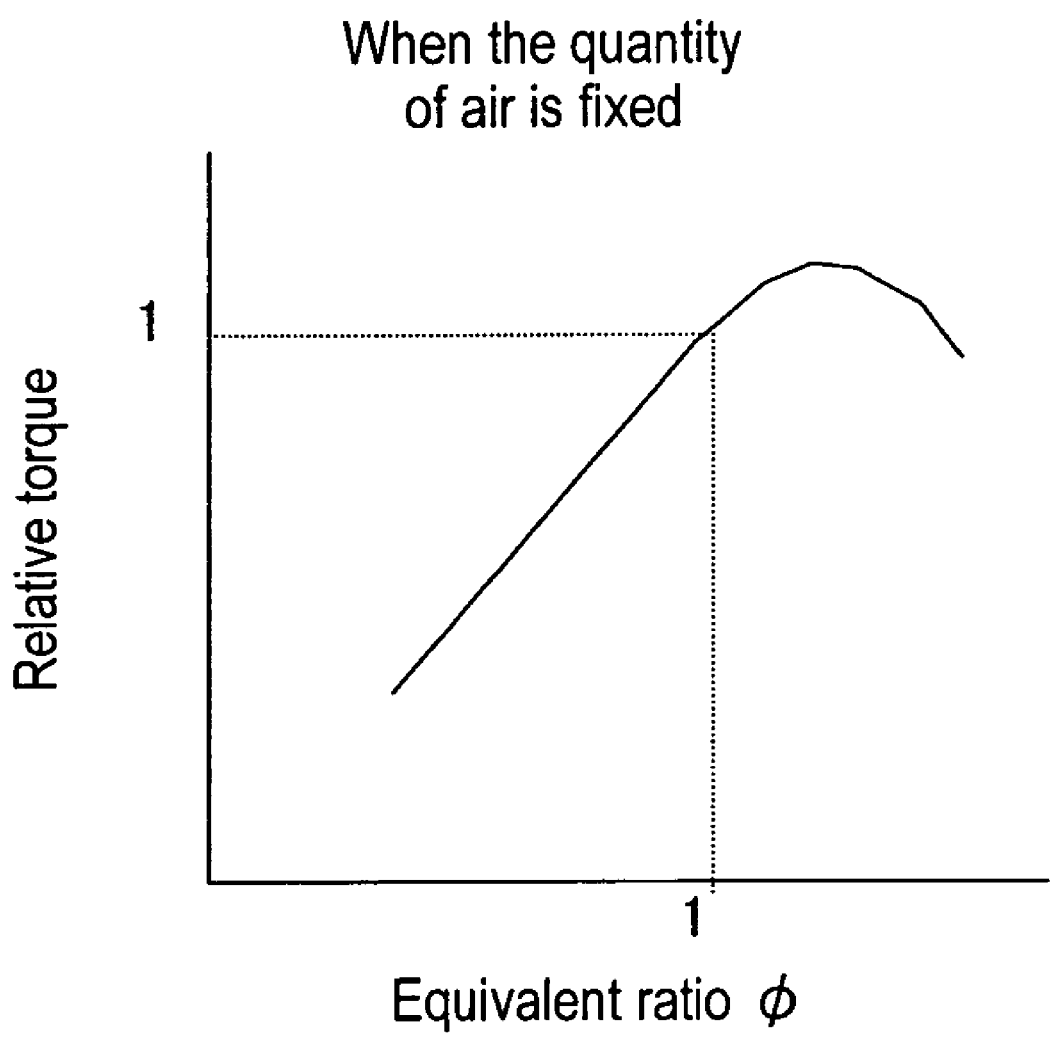
FIG. 7 is a diagram showing the relationship between equivalent ratio and relative torque when the quantity of air in the internal combustion engine is fixed.

FIG. 6 shows details of the fuel correction quantity computation means 302. The fuel correction quantity computation means 302 computes the correction quantity of fuel based on the above correction quantity of torque apportioned to fuel correction and the above fuel correction permission decision. The correction quantity of fuel is supplied to a fuel injection quantity computation unit (not shown) which reflects the computation result of an equation (injection quantity of fuel=basic injection quantity of fuel×correction quantity of fuel) on the correction quantity of fuel. When fuel correction is not permitted, the correction quantity of fuel is computed as 1 and when fuel correction is permitted, the correction quantity of fuel is computed based on the relationship between the correction quantity of torque and the correction quantity of fuel shown in FIG. 7. The relationship of FIG. 6 is based on the commonly known relationship between equivalent ratio $\phi$ and torque shown in FIG. 7 (when the quantity of air is fixed).

Figure 8:
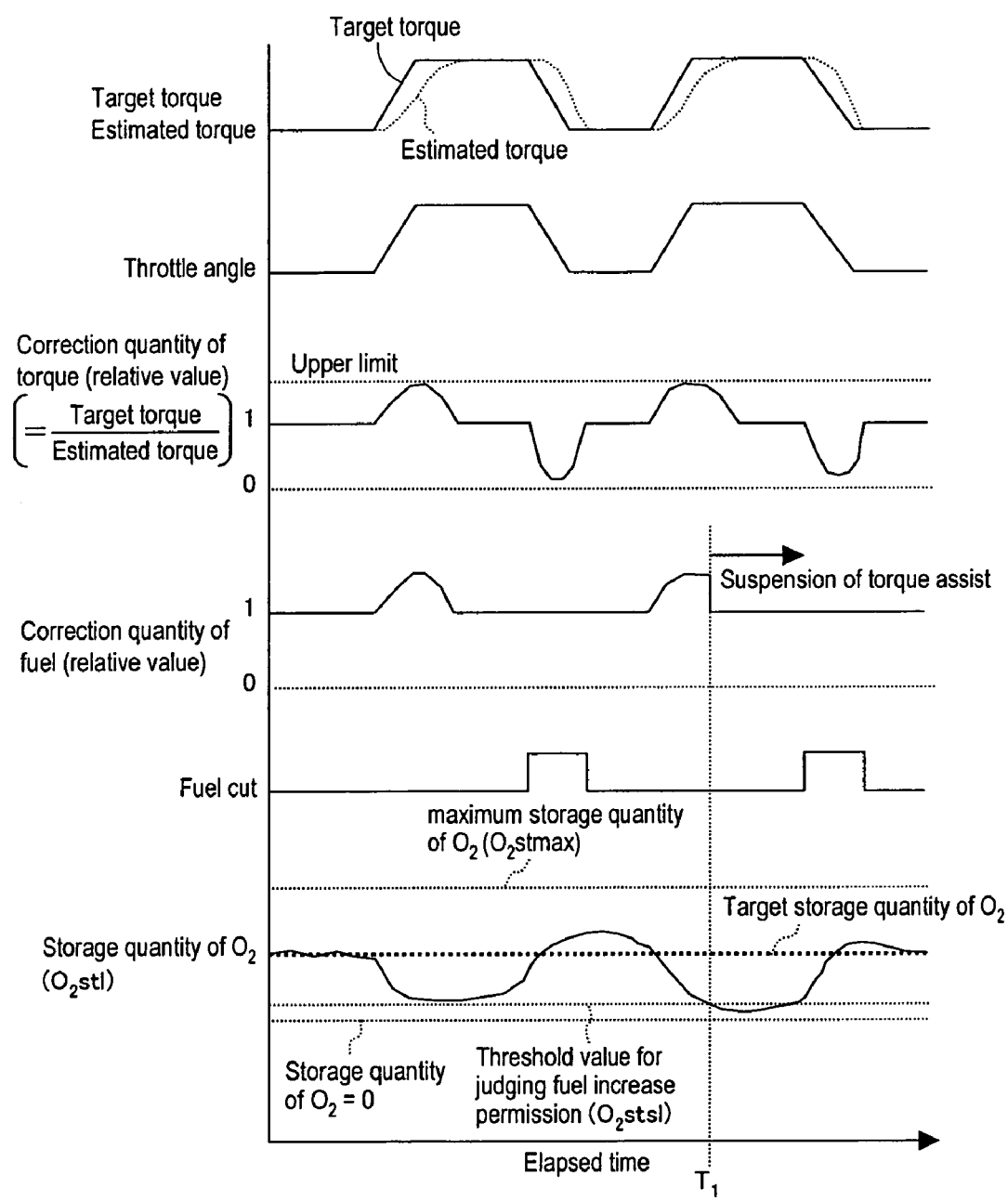
FIG. 8 is a diagram showing the behavior of each operation value when a torque increase is demanded from the internal combustion engine controller of the first embodiment shown in FIG. 2 (emergency is not high)
Figure 9:
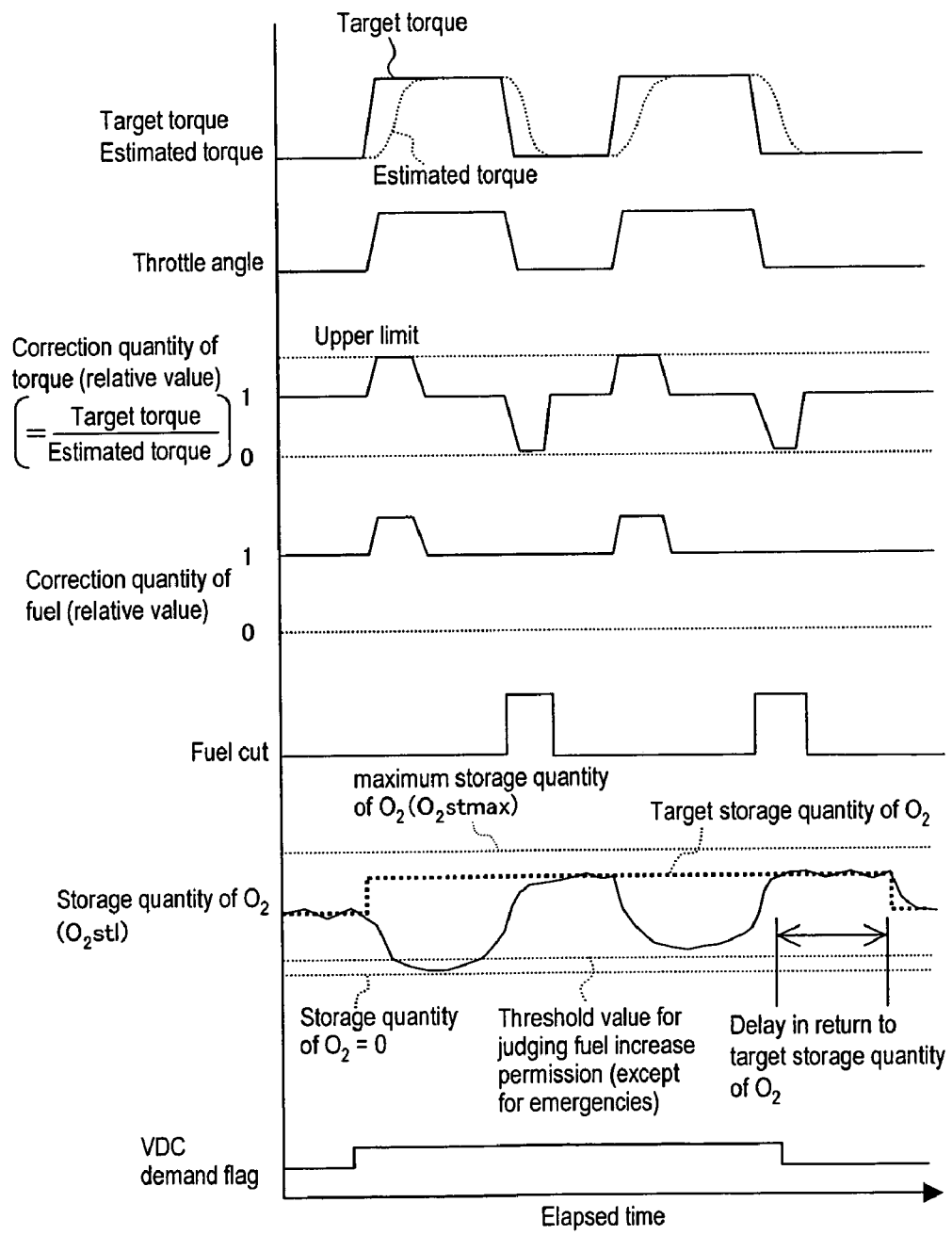
FIG. 9 is a diagram showing the behavior of each operation value when a torque increase is demanded from the internal combustion engine controller of the first embodiment shown in FIG. 2 (emergency is high)

FIG. 8 and FIG. 9 show the step of computing parameters for the torque base type engine control of this embodiment when a high-response torque increase is demanded.

The step of computation when emergency is not high will be explained with reference to FIG. 8. The target torque computed by the above target torque computation means 202 is supplied to the above target air quantity computation means 205, and the above target throttle angle computation means 206 computes the target throttle angle based on the computed target quantity of air. Torque control is carried out by controlling the quantity of air based on this target throttle angle. Since a torque control delay caused by a delay in air intake occurs, an increase in the quantity of fuel for torque assist is computed by the following procedure.

The above torque correction quantity computation means 208 computes the correction quantity of torque (relative value) as an index for compensating for a shortage or excess of torque based on the estimated torque computed by the above actual torque estimation means 207 and the target torque. The above torque assist selection means 209 determines torque assist based on the above correction quantity of torque and the operation state.

When the correction quantity of torque is larger than 1 (torque assist is for increasing torque), an increase in the quantity of fuel is selected as torque assist and when the correction quantity of torque is smaller than 1 (torque assist is for reducing torque), a fuel cut is selected as torque assist. When the correction quantity of torque is larger than 1, the correction quantity of torque is supplied to the torque assist-purpose fuel correction quantity computation means 214 to compute the appropriate correction quantity of fuel. The $O_2$ storage computation means 300 in the torque assist-purpose fuel correction quantity computation means 214 estimates the storage of $O_2$ sequentially to compare this estimated $O_2$st with the above $O_2$stsl. When $O_2$st$\geq$storage quantity of $O_2 \geq O_2$stsl, the fuel correction permission flag is set to 1 and when $O_2$st$\leq O_2$stsl, the fuel correction permission flag is set to 0.

The fuel correction quantity computation means 302 computes 1 as the correction quantity of fuel when the above fuel correction permission flag is 0 and computes the correction quantity of fuel for realizing the desired quantity of torque assist based on a fuel correction quantity computation table using the correction quantity of torque as an argument.

In the example shown in FIG. 8, as $O_2$st$\geq O_2$stsl is established before the elapsed time T1, the correction of fuel at the time of an increase in torque is permitted. As $O_2$st$\leq O_2$stsl after the elapsed time T1, the correction of fuel at the time of an increase in torque is not permitted in consideration of the deterioration of the exhaust gas.

As described above, in this embodiment, when the correction quantity of fuel for realizing the desired quantity of torque assist is to be computed, the storage quantity of $O_2$ in the three-way catalyst 113 is estimated and it is judged whether a shift of the air-fuel ratio at the inlet of the catalyst 113 from the theoretical air-fuel ratio caused by the correction of fuel is permitted or not at all times to determine the correction quantity of fuel, thereby making it possible to prevent the deterioration of the exhaust gas.

The step of computation when emergency is high will be explained with reference to FIG. 9. In this case, regardless of the storage quantity of $O_2$ in the three-way catalyst 113 as described above, the above fuel correction permission flag becomes 1 unconditionally as described above, and the correction quantity of fuel for realizing the desired quantity of torque assist is computed based on the correction quantity of torque input into the above fuel correction quantity computation means 302.

However, in this case, when the storage quantity of $O_2$ in the three-way catalyst 113 is small, the purification of the exhaust gas is not carried out at the time of an increase in the quantity of fuel, thereby deteriorating the exhaust gas (CO and HC are discharged from the tail pipe). Then, to avoid such inconvenience as much as possible, the following control is carried out by the above target $O_2$ storage quantity computation means 400.

In general, air-fuel ratio control is carried out such that the storage quantity of $O_2$ becomes about half of $O_2$stmax to cope with a case where the air-fuel ratio at the inlet of the catalyst 113 becomes rich or lean. However, when it is expected that there are a large number of chances of torque assist caused by an increase in the quantity of fuel like the execution of VDC, whereby the air-fuel ratio at the inlet of the catalyst becomes rich very frequently, it is considered to be advantageous in terms of the purification of the exhaust gas that the target storage quantity of $O_2$ should be set larger than the regular quantity.

Then, in this embodiment, for a certain period of time after a VDC input signal is input, an instruction to increase the target storage quantity of $O_2$ is supplied to the fuel injection quantity computation unit (not shown) and then the normal target storage quantity of $O_2$ is returned. Even when the VDC demand flag comes to "0", a time delay is provided before returning to the normal target storage quantity of $O_2$, thereby making it possible to reduce the deterioration of the exhaust gas in case of VDC demand being made intermittently.

A description is subsequently given of the second embodiment of the present invention. This embodiment is the same as the above first embodiment in basic configuration except that improved fuel correction quantity computation means 302' which differs from the fuel correction quantity computation means 302 in operation logic is used in place of the fuel correction quantity computation means 302.

FIG. 10 shows details of the fuel correction quantity computation means 302' of the operation logic. In the case of the first embodiment, torque assist is interrupted abruptly according to the storage quantity of $O_2$ while torque assist is carried out by an increase in the quantity of fuel in response to a torque increase demand when emergency is low, thereby causing a torque difference and making the driver feel that something is wrong. Then, in this second embodiment, to prevent the interruption of torque assist when high-response torque is demanded, the correction quantity of fuel is computed in consideration of the correction quantity of demanded torque and the storage quantity of $O_2$. Stated more specifically, after the correction quantity of fuel is computed based on the correction quantity of demanded torque as in the first embodiment, the final correction quantity of fuel is obtained by multiplying it with a correction coefficient which is determined by the storage quantity of $O_2$. The above correction coefficient is 1 when the storage quantity of $O_2$ is much larger than the threshold value and no correction is made actually. When the storage quantity of $O_2$ is smaller than the threshold value, the correction coefficient is 0 to 1 to reduce the correction quantity of fuel.

FIG. 11 shows the contents of computation when the same target torque is given in the logic shown in the first embodiment and the logic shown in the second embodiment. In the first embodiment, at the elapsed time T2, torque assist by increasing the quantity of fuel is inhibited and the driver feels that something is wrong. In the second embodiment, the storage quantity of $O_2$ is not consumed at a time by the correction of fuel according to the above logic, thereby making it possible to reduce the possibility of interrupting torque assist.

INDUSTRIAL APPLICABILITY

As can be understood from the above description, the internal combustion engine controller of the present invention carries out torque assist control by increasing the quantity of fuel according to circumstances in consideration of the emergency of a torque increase demand, the operation state such as the uniform charge stoichiometric combustion of the internal combustion engine and the storage quantity of $O_2$ in the three-way catalyst, thereby making it possible to realize torque increasing performance and exhaust gas purifying performance in a well-balanced manner.

The invention claimed is:

1. An internal combustion engine controller, comprising target torque computation means for computing target torque based on the demand torque of an internal combustion engine such as the operation of an accelerator, means of computing a target throttle angle based on the target torque, and torque assist control means for assisting torque based on the state of the target torque and the operation state of the internal combustion engine, wherein
the torque assist control means carries out torque assist control by increasing the quantity of fuel when a torque increase is demanded;
wherein the operation state of the internal combustion engine is the uniform charge stoichiometric combustion state of the internal combustion engine having a three-way catalyst; and
a fuel correction quantity computation means comprises fuel correction permission judging means which judges whether fuel correction is permitted or not based on the state of the target torque, the operation state of an external system and an estimated adsorption quantity of oxygen in a catalyst.

2. The internal combustion engine controller according to claim 1, wherein the fuel correction permission judging means permits torque assist control by increasing the quantity of fuel when torque increase is demanded by an external system such as vehicle stable control, brake control and fraction control.

3. The internal combustion engine controller according to claim 2, wherein the fuel correction quantity computation means comprises oxygen storage computation means which increases the target adsorption ratio of oxygen in the catalyst when torque assist control by increasing the quantity of fuel is permitted.

4. The internal combustion engine controller according to claim 3, wherein the oxygen storage computation means returns the target adsorption ratio of oxygen in the catalyst to a normal value with a time delay when decision on the permission of torque assist control by increasing the quantity of fuel comes to an end.

5. The internal combustion engine controller according to claim 1, wherein the fuel correction permission judging means permits torque assist control by increasing the quantity of fuel when the estimated adsorption quantity of oxygen in the catalyst is larger than a predetermined threshold value.

6. The internal combustion engine controller according to claim 5, wherein the fuel correction permission judging means comprises means of judging the emergency of a torque increase demand and permits torque assist control by increasing the quantity of fuel regardless of the storage quantity of oxygen in the catalyst for a torque increase demand having high emergency.

* * * * *